US010431971B2

(12) United States Patent
Randolph

(10) Patent No.: US 10,431,971 B2
(45) Date of Patent: Oct. 1, 2019

(54) THERMAL PROTECTOR

(71) Applicant: TYCO ELECTRONICS CORPORATION, Berwyn, PA (US)

(72) Inventor: Kurt Allan Randolph, Etters, PA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 226 days.

(21) Appl. No.: 15/397,812

(22) Filed: Jan. 4, 2017

(65) Prior Publication Data

US 2018/0191146 A1 Jul. 5, 2018

(51) Int. Cl.
| *H02H 5/04* | (2006.01) |
| *H02H 1/00* | (2006.01) |
| *H01F 5/04* | (2006.01) |
| *H01F 27/29* | (2006.01) |
| *H01F 27/32* | (2006.01) |
| *H01F 27/40* | (2006.01) |
| *H02K 11/25* | (2016.01) |
| *H01R 4/18* | (2006.01) |
| *H01F 7/06* | (2006.01) |

(52) U.S. Cl.
CPC .......... *H02H 1/0038* (2013.01); *H01F 5/04* (2013.01); *H01F 27/29* (2013.01); *H01F 27/325* (2013.01); *H01F 27/402* (2013.01); *H02H 5/04* (2013.01); *H02K 11/25* (2016.01); *H01F 2007/062* (2013.01); *H01F 2027/406* (2013.01); *H01R 4/182* (2013.01); *H02K 2203/12* (2013.01)

(58) Field of Classification Search
USPC ................................ 361/103, 23, 25, 27, 37
See application file for complete search history.

(56) References Cited

U.S. PATENT DOCUMENTS

| 4,132,913 | A | | 1/1979 | Lautner et al. |
| 4,166,265 | A | | 8/1979 | Reynolds et al. |
| 4,585,964 | A | * | 4/1986 | Hildebrandt ............. H02K 3/50 200/80 R |
| 5,447,455 | A | | 9/1995 | Plösser |
| 5,463,522 | A | * | 10/1995 | Van Wagener ....... H01F 27/402 361/103 |
| 7,859,380 | B2 | | 12/2010 | Hasenour et al. |
| 2009/0050432 | A1 | | 2/2009 | Oh et al. |
| 2016/0053830 | A1 | | 2/2016 | Mogi |

FOREIGN PATENT DOCUMENTS

| JP | H07 169381 A | 7/1995 |
| JP | 2004319395 A | 11/2004 |
| KR | 20080106765 A | 12/2008 |

OTHER PUBLICATIONS

International Search Report and Written Opinion issued for PCT/IB2017/058507 dated Apr. 3, 2018.

* cited by examiner

Primary Examiner — Ronald W Leja

(57) ABSTRACT

A thermal protector including a body integrally connected to a magnet wire terminating feature.

5 Claims, 4 Drawing Sheets

THERMAL PROTECTOR

FIELD OF THE INVENTION

The present invention is directed to bobbins for carrying magnet wire, and in particular, the invention is directed to a thermal protector for use with the bobbins.

BACKGROUND OF THE INVENTION

Many consumer products involve electric motors or field windings that employ magnet wire carried by bobbins. Not surprisingly, thermal protection devices have become a mandatory, integral feature for most consumer products to guard against accidental overheating and fires. Traditional methods to connect thermal protectors to magnet wire involve splices to join the magnet wire to stranded lead wires which in turn are crimped or soldered to the thermal protector. For example, as shown in FIG. 1, a thermal protector 12 includes receptacle portions 14 for receiving stripped ends 16 of lead wires 18. This arrangement complicates manufacturing, adds expense and is time-consuming.

U.S. Pat. No. 4,132,913 is directed to a bobbin arrangement with a one-shot thermal protector. The bobbin arrangement is connected to terminal lead wire portions extending from the thermal protector.

U.S. Pat. No. 4,166,265 is directed to a coil bobbin having contact receiving cavities extending into one of its flanges and integral binding posts for the wire extending from the flange. Electrical connections to the ends of the winding wire are made by inserting terminals into each of the terminal receiving cavities. Each terminal has an upper receptacle portion, which is dimensioned to receive the contact pin on an external conductor, and a conduct portion at its lower end for establishing contact with the coil wire.

U.S. Pat. No. 5,447,455 is directed to an electrical assembly for terminating magnet wire, having a housing and contact receiving cavities provided therein. Electrical connections to the ends of the winding magnet wire are made by inserting terminals into each of the terminal receiving cavities. The terminals include crimp connectors extending opposite the contact receiving cavities.

There is need in the art for an improved thermal protector that does not suffer from these shortcomings.

SUMMARY OF THE INVENTION

An embodiment is directed to a thermal protector including a body integrally connected to a magnet wire terminating feature.

A further embodiment is directed to a thermally protected bobbin including a magnet wire wound onto a spindle and a thermal protector including a body integrally connected to a magnet wire terminating feature. The magnet wire terminating feature forms a connection with the magnet wire.

A yet further embodiment is directed to a thermally protected bobbin including a magnet wire having opposed ends wound onto a spindle, the spindle having a splice opening for receiving the magnet wire between the opposed ends. A thermal protector including a body integrally connected to a magnet wire terminating feature. Each magnet wire terminating feature is received by a corresponding splice opening, each magnet wire terminating feature forming a connection with the magnet wire.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. Terms such as "attached," "affixed," "connected," "coupled," "interconnected," "engaged," "installed" and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Figure 1:
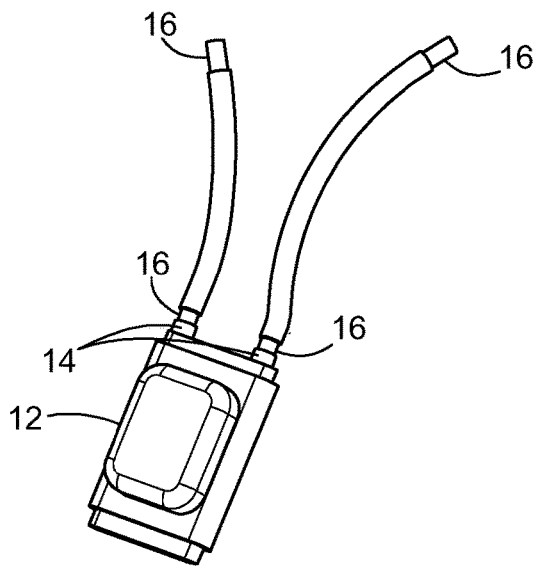
FIG. 1 is a prior art arrangement for a thermal protector.
Figure 2:
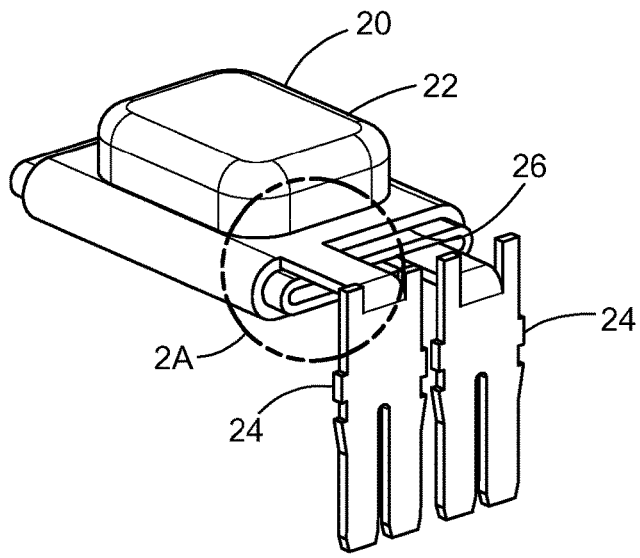
FIG. 2 is an upper perspective view of an exemplary thermal protector of the present invention.
Figure 2A:
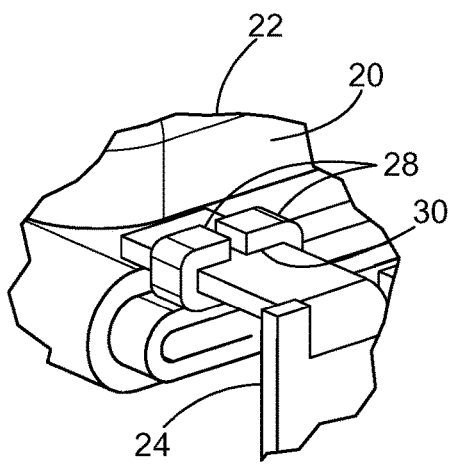
FIG. 2A is an enlarged, partial upper perspective view of an exemplary thermal protector taken from region 2 of FIG. 2.
Figure 3:
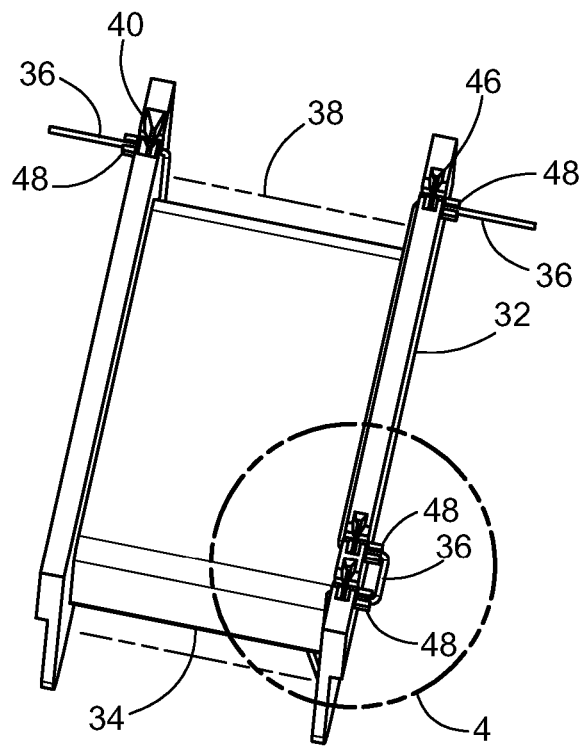
FIG. 3 is an upper perspective view of an exemplary bobbin of the present invention.

FIG. 2 shows a novel construction for a thermal protector 20 of the present invention. Thermal protector 20 includes a body 22 extending to a magnet wire terminating feature 24. Body 22 and magnet wire terminating features 24 are integrally connected. In one embodiment, body 22 and magnet wire terminating features 24 are of unitary or one-piece construction. That is, in one instance, body 22 extends to magnet wire terminating features 24, such as from an outer material layer 26 of body 22, or in another instance, magnet wire terminating features 24 extends inside of body 22, with each of the two instances shown in FIG. 2. Optionally, as shown in FIG. 2A, which is taken from region 2 of FIG. 2, body 22 terminates at a pair of tabs 28, which tabs 28 forming a crimp connection 30 with magnet wire terminating feature 24.

The term "connection" in the context of physical contact between the thermal protector, magnet wires and magnet wire terminating features is intended to mean that an electrical connection is established therebetween.

The term "integrally connected" is intended to mean the thermal protector is directly connected to the magnet wire terminating feature, and more specifically, that there is no intervening lead wire having opposed stripped ends that must be connected to the thermal protector at one end of the lead wire and the magnet wire terminating feature at the other end of the lead wire.

Magnet wire terminating feature 24 includes discontinuities such as notches, serrations and the like, such that when brought into contact with magnet wire, which typically has a varnish coat, the wire terminating feature sufficiently wears away the varnish coat to provide an electrical connection between the magnet wire terminating feature and the magnet wire. In one embodiment, wire terminating feature 24 acts as an insulation displacement connector. That is, wire terminating feature 24 can displace, e.g., remove, such as by cutting through the insulation of a wire, to establish an electrical connection between the wire terminating feature and the inner conductor of the insulated wire. In other words, the thermal protector of the present invention may be utilized in applications utilizing insulated wire, versus being limited to magnet wire. An exemplary wire terminating feature is incorporated in MAG-MATE terminals, which is a registered trademark of AMP Corporation.

The novel thermal protector of the present invention provides several advantages. For example, conventional lead wires, requiring stripping insulation from opposed ends of the lead wire and then separately connecting the opposed ends to the thermal protector at one end and to a magnet wire terminating feature at the other end, are eliminated, saving material costs, and by virtue of the reduction of electrical connections, improving reliability of the thermal protector. Furthermore, as will be described in further detail below, the manufacturing process can be fully automated, resulting in reduced manufacturing time.

The term "thermally protected bobbin" refers to a bobbin carrying magnet wire that is connected to a thermal protector of the present invention.

Figure 4:
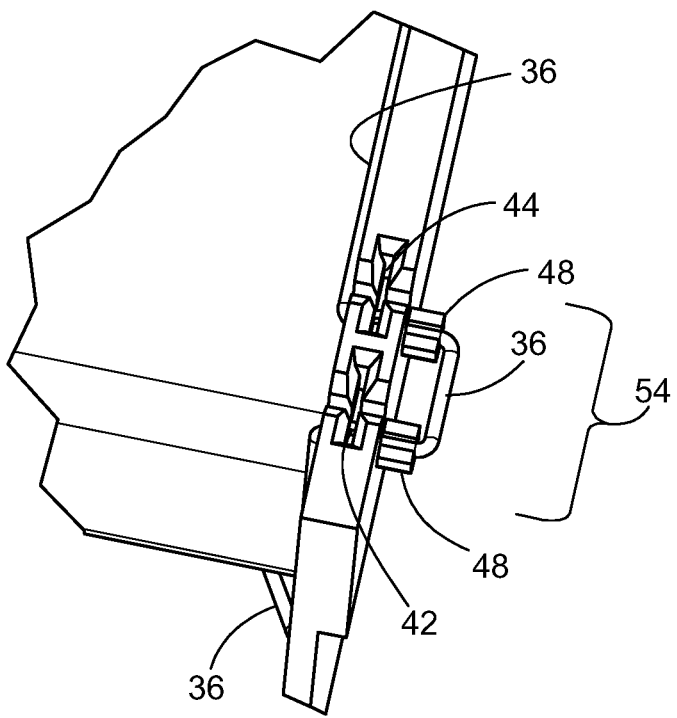
FIG. 4 is an enlarged, partial view of the bobbin of FIG. 3 of the present invention.

As shown in FIGS. 3-9, sequential steps for assembling an exemplary thermally protected bobbin (FIG. 10) are now discussed. As further shown in FIG. 3, a bobbin 32 includes a spindle 34 about which a magnet wire 36 is wound. Magnet wire windings 38 about spindle 34 are shown in phantom for purposes of clarity. Spindle 34 includes splice openings 40, 42, 44, 46 formed therein. At one end, magnet wire 36 is fed through and received by splice opening 40, wound around spindle 34 (forming magnet wire windings 38), and then fed through and received by splice opening 42 (FIG. 4), then through a splice opening 44 (FIG. 4). The portion of bobbin 32 including splice openings 42, 44 is referred to as a splice region 54. After being fed through and received by splice opening 44, magnet wire 36 is fed through and received by splice opening 46, after which magnet wire 36 is terminated. Posts 48 are positioned adjacent to splice openings 40, 42, 44, and 46 to at least assist with temporarily securing magnet wire 36 in the splice openings. Splice openings 42, 44 are positioned between opposed ends of magnet wire 36.

Figure 5:
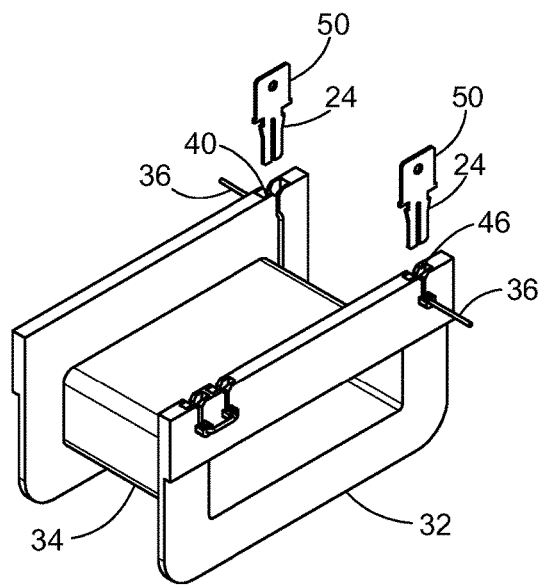
FIGS. 5-9 are sequential steps for assembling an exemplary thermally protected bobbin of the present invention.
Figure 6:
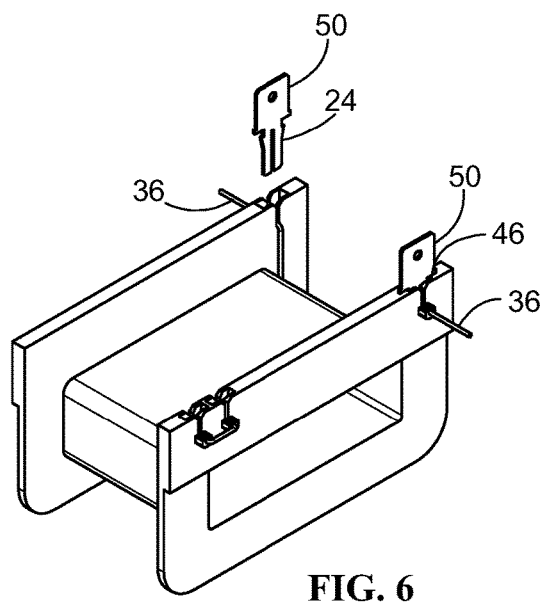
Figure 7:
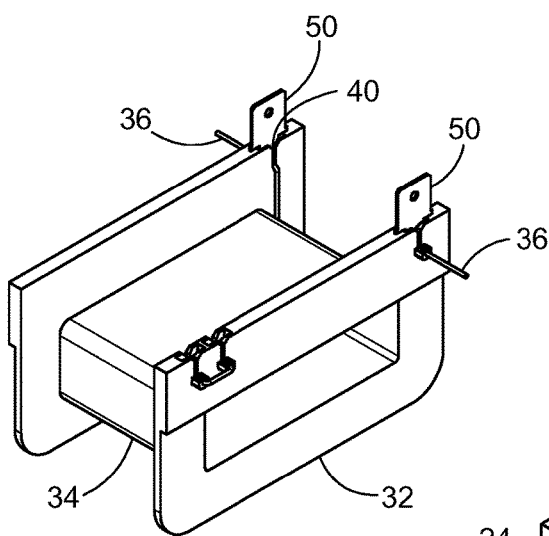

Once magnet wire 36 has been fed through and received by splice openings 40, 42, 44, 46, then as further shown in FIG. 5, magnet wire terminating features 24 of terminals 50 are aligned with respective splice openings 40, 46. Magnet wire terminating features 24 of terminals 50 are then inserted into splice opening 46 (FIG. 6) and inserted into splice opening 40 (FIG. 7) for forming respective connections with magnet wire 36.

Figure 8:
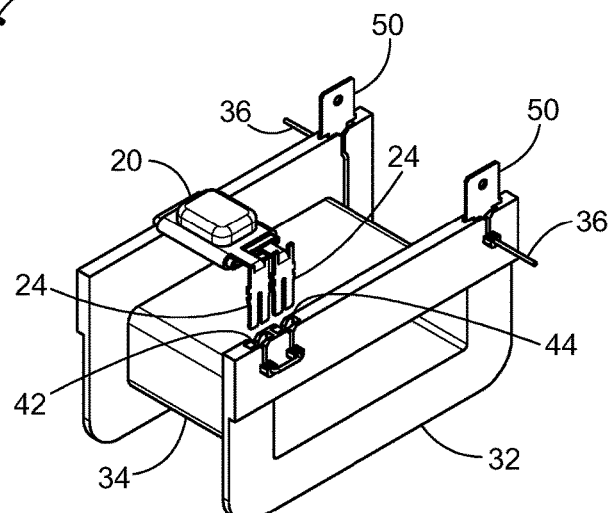
Figure 9:
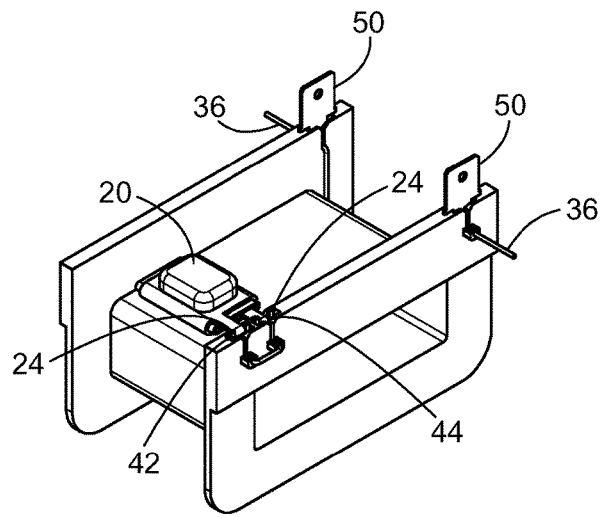

Once magnet wire terminating features 24 of terminals 50 have been inserted into splice openings 40, 46, then as shown in FIG. 8, magnet wire terminating features 24 of thermal protector 20 are aligned with respective splice openings 42, 44. As shown in each of FIG. 9 and FIG. 11 (which is an enlarged, partial view taken from region 11 of FIG. 10), magnet wire terminating features 24 of thermal protector 20 are then inserted into respective splice openings 42, 44 for forming respective connections with magnet wire 36.

It is to be understood that insertion of magnet wire terminating features 24 of terminals 50 and magnet wire terminating features 24 of thermal protector 20 into their respective splice openings 40, 42, 44, 46 may be performed in any order.

Figure 10:
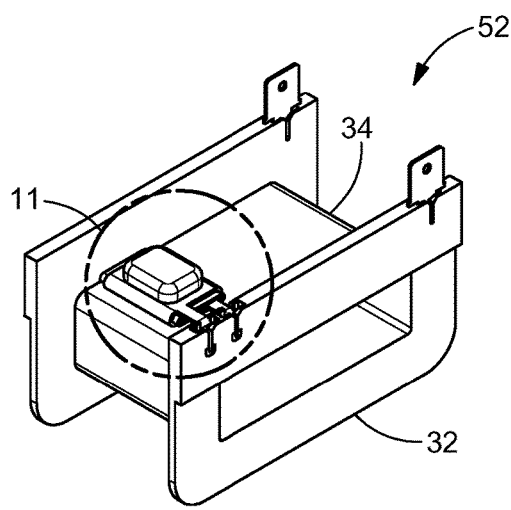
FIG. 10 is an upper perspective view of an exemplary thermally protected bobbin of the present invention.
Figure 11:
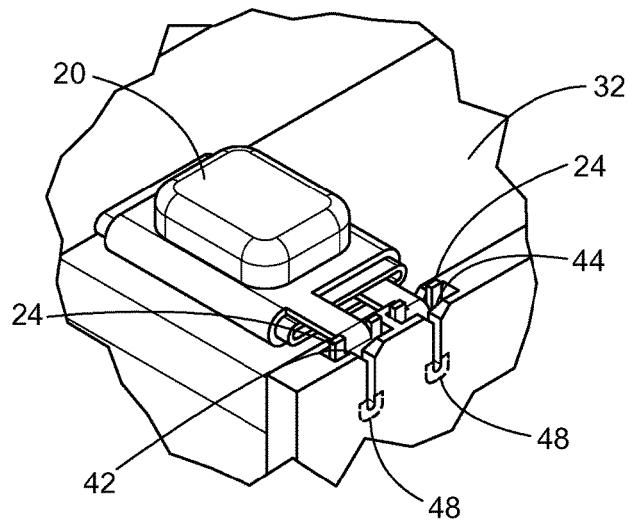
FIG. 11 is an enlarged view of the thermally protected bobbin taken from region 11 of FIG. 10.

FIG. 10 shows a completed thermally protected bobbin 52, in which the respective posts 48 (enlarged view of posts associated with splice openings 42, 44 shown in FIG. 11) have been removed or cut substantially flush with the surface of the bobbin, which post removal may occur during or subsequent to the magnet wire terminating features forming respective connections with the magnet wire. In one embodiment, one or more of posts 48 (FIG. 3) may be retained in case the posts are to be used for other purposes. However, the segment of wire 36 extending between splice openings 42 and 44 must be removed, in order that magnet wire terminating features 24 of thermal protector 20 form an electrical connection in series with magnet wire 36 extending between splice openings 40 and 46.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A thermal protector comprising:
   a body integrally connected to a magnet wire terminating feature;
   the body and the magnet wire terminating feature are together formed in a unitary construction;
   the magnet wire terminating feature having discontinuities wherein when the discontinuities of the magnet wire terminating feature are brought into contact with a magnet wire, the magnet wire terminating feature provides an electrical connection between the magnet wire terminating feature and the magnet wire.

2. The thermal protector of claim 1, wherein the magnet wire terminating feature is an insulation displacement connector.

3. A thermally protected bobbin comprising:
   a magnet wire having opposed ends wound onto a spindle, the spindle having a splice opening for receiving the magnet wire between the opposed ends; and
   a thermal protector comprising a body integrally connected to a magnet wire terminating feature, the body and the magnet wire terminating feature are together formed in a unitary construction, the magnet wire terminating feature having discontinuities;

wherein each magnet wire terminating feature is received by a corresponding splice opening, each magnet wire terminating feature is brought into contact with the magnet wire, discontinuities of the magnet wire terminating feature and provides an electrical connection between the magnet wire terminating feature and the magnet wire.

4. The thermally protected bobbin of claim 3, wherein the splice opening having a post for receiving the magnet wire subsequent to the magnet wire extending through the splice opening, the post being removed during or subsequent to the magnet wire terminating feature forming a connection with the magnet wire.

5. The thermally protected bobbin of claim 4, wherein a magnet wire segment extending between each magnet wire terminating feature is removed from the spindle.

* * * * *